(12) United States Patent
Matsui et al.

(10) Patent No.: US 12,215,641 B2
(45) Date of Patent: Feb. 4, 2025

(54) ENGINE

(71) Applicant: YANMAR POWER TECHNOLOGY CO., LTD., Osaka (JP)

(72) Inventors: Yu Matsui, Osaka (JP); Masato Kishiura, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 18/658,130

(22) Filed: May 8, 2024

(65) Prior Publication Data

US 2024/0287944 A1     Aug. 29, 2024

Related U.S. Application Data

(63) Continuation of application No. 18/124,924, filed on Mar. 22, 2023, now Pat. No. 12,012,907, which is a continuation of application No. 17/513,076, filed on Oct. 28, 2021, now Pat. No. 11,635,033, which is a continuation of application No. 16/762,553, filed as application No. PCT/JP2018/042767 on Nov. 20, 2018, now Pat. No. 11,187,164.

(30) Foreign Application Priority Data

Dec. 18, 2017   (JP) ................................ 2017-241707

(51) Int. Cl.
| | |
|---|---|
| *F02D 21/08* | (2006.01) |
| *F02M 26/30* | (2016.01) |
| *F02M 26/33* | (2016.01) |
| *F02M 26/41* | (2016.01) |

(52) U.S. Cl.
CPC ............. *F02D 21/08* (2013.01); *F02M 26/30* (2016.02); *F02M 26/33* (2016.02); *F02M 26/41* (2016.02)

(58) Field of Classification Search
CPC ........ F02D 21/08; F02M 26/30; F02M 26/33; F02M 26/41; F02M 26/25; F02M 26/26
See application file for complete search history.

(56) References Cited

U.S. PATENT DOCUMENTS

| | | | |
|---|---|---|---|
| 7,581,533 B1 * | 9/2009 | Moran | F02M 26/26 |
| | | | 123/568.12 |
| 9,664,087 B2 * | 5/2017 | Sloss | F02D 9/10 |
| 9,810,180 B2 * | 11/2017 | Yoshida | F02M 26/13 |
| 10,502,118 B2 * | 12/2019 | Murata | F01N 5/02 |

(Continued)

FOREIGN PATENT DOCUMENTS

| | | |
|---|---|---|
| JP | 2003-520922 A | 7/2003 |
| JP | 3633824 B | 1/2005 |

(Continued)

OTHER PUBLICATIONS

International Search Report for PCT Patent App. No. PCT/JP2018/042767 (Jan. 15, 2019).

*Primary Examiner* — Xiao En Mo

(74) *Attorney, Agent, or Firm* — Future IP LLC; Tomoko Nakajima

(57) ABSTRACT

An engine includes an exhaust manifold, and an EGR cooler connected to the exhaust manifold. The EGR cooler overlaps, in a rear view, with a gear case cover which is arranged to face a flywheel housing to be protected from an external impact, particularly, from an impact from the rear side.

5 Claims, 5 Drawing Sheets

(56) References Cited

U.S. PATENT DOCUMENTS

| | | | |
|---|---|---|---|
| 2002/0000222 A1* | 1/2002 | Matsuura | F01N 13/10 |
| | | | 123/568.11 |
| 2003/0111211 A1 | 6/2003 | Stonehouse et al. | |
| 2006/0005791 A1* | 1/2006 | Obidi | F02M 26/28 |
| | | | 123/41.44 |
| 2008/0314569 A1* | 12/2008 | Yamazaki | F02M 37/0029 |
| | | | 123/568.12 |
| 2010/0243220 A1 | 9/2010 | Geskes et al. | |
| 2012/0017575 A1* | 1/2012 | Sloss | F28F 27/02 |
| | | | 60/320 |
| 2013/0061584 A1* | 3/2013 | Gerges | F28D 9/0056 |
| | | | 165/166 |
| 2014/0251579 A1* | 9/2014 | Sloss | F28F 27/02 |
| | | | 165/96 |
| 2016/0186704 A1* | 6/2016 | Murotani | F02M 35/10222 |
| | | | 123/568.12 |
| 2017/0107952 A1* | 4/2017 | Yang | F02M 26/30 |
| 2017/0138320 A1* | 5/2017 | Kim | F02M 26/28 |
| 2020/0191100 A1* | 6/2020 | Koguchi | F01L 1/022 |
| 2022/0186662 A1* | 6/2022 | Walters | F02M 26/32 |

FOREIGN PATENT DOCUMENTS

| | | | | |
|---|---|---|---|---|
| JP | 2005-232996 A | | 9/2005 | |
| JP | 2008014232 A | * | 1/2008 | ............ F02M 26/27 |
| JP | 2012-246805 A | | 12/2012 | |
| JP | 2013-532788 A | | 8/2013 | |
| JP | 6067092 B | | 1/2017 | |

\* cited by examiner

FIG. 4A TOP VIEW
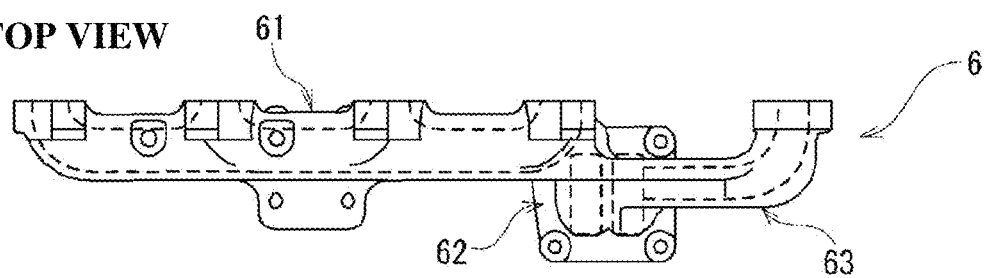
FIG. 4B FRONT VIEW
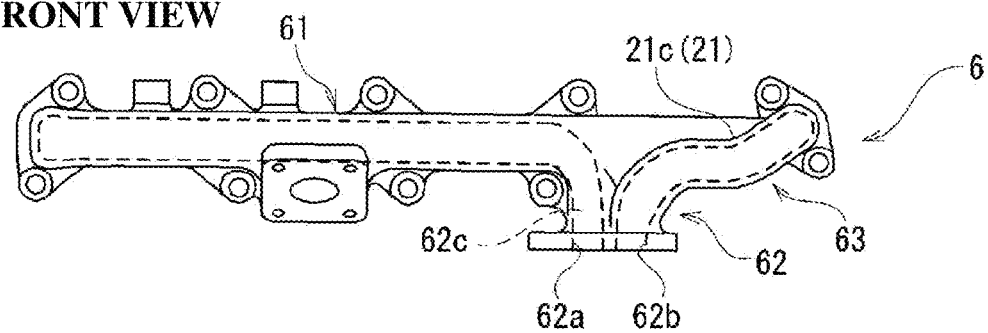
FIG. 4C BOTTOM VIEW
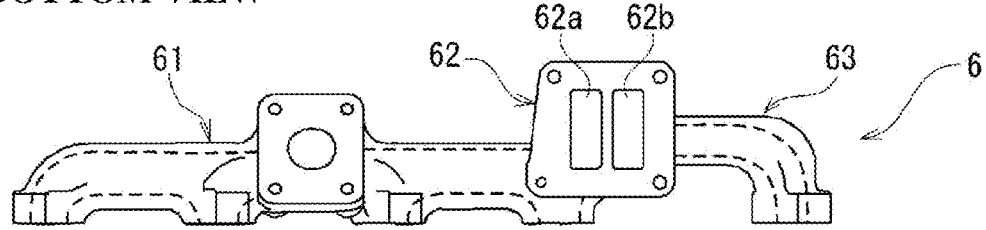

ENGINE

This application is a Continuation under 35 U.S.C. § 120 of U.S. patent application Ser. No. 18/124,924, filed Mar. 22, 2023, which was a Continuation under 35 U.S.C. § 120 of U.S. patent application Ser. No. 17/513,076, filed Oct. 28, 2021, which was a Continuation under 35 U.S.C. § 120 of U.S. patent application Ser. No. 16/762,553, filed May 8, 2020, which was a national phase entry under 35 U.S.C. § 371 of PCT Patent Application No. PCT/JP2018,042767, filed on Nov. 20, 2018, which claims priority under 35 U.S.C. § 119 to Japanese Patent Application No. 2017-241707, filed Dec. 18, 2017, the entireties of which are incorporated by reference.

TECHNICAL FIELD

The present invention relates to an engine including an EGR device.

BACKGROUND ART

There has been known an engine including an EGR device which recirculates part of exhaust gas to intake air. The EGR device lowers combustion temperature by recirculating post-combustion exhaust gas with a low oxygen concentration (EGR gas) to the intake air. This drop in the combustion temperature suppresses and reduces generation of nitrogen oxides. In general, the EGR gas is recirculated to the intake air after being cooled by an EGR cooler.

Patent Literature 1 (hereinafter, PTL 1) below discloses a structure including an EGR cooler on a side of a cylinder block. A flange on an EGR gas inlet side of the EGR cooler is supported by an exhaust manifold, and a flange on an EGR gas outlet side of the EGR cooler is supported by an exhaust gas communication pipe which is a member separate from the exhaust manifold. Further, Patent Literature 2 (hereinafter, PTL 2) below discloses a structure in which an EGR cooler is fixed to the outside surface of an exhaust manifold by using two bands.

CITATION LIST

Patent Literature

PTL 1: Japanese Patent No. 6067092
PTL 2: Japanese Patent No. 3633824

SUMMARY OF INVENTION

Technical Problem

In PTL 1, a stress is applied to flanges of the EGR cooler due to a difference in thermal expansion of members which respectively support an EGR gas intake side and an EGR gas outlet side, and which are different from each other. Meanwhile, PTL 2 requires multiple bands to support the EGR cooler, which leads to an increase in the number of members, consequently increasing the cost.

The present invention have been made in view of the above problems, and it is an object of the present invention to provide an engine capable of suppressing stress to flanges of an EGR cooler, which stress is caused by thermal expansion, while enabling a reduction of the number of members.

Solution to Problem

An aspect of the present invention is an engine including an exhaust manifold, an intake manifold, and an EGR device configured to supply EGR gas from the exhaust manifold to the intake manifold.

An upper end of the EGR cooler extended downward is attached to a downwardly extending attachment part provided to the exhaust manifold.

The above aspect of the present invention may be such that an EGR pipe extended from the EGR cooler to the intake manifold is partially formed inside the exhaust manifold.

The above aspect of the present invention may be such that the EGR cooler includes a cooling unit configured to cool the EGR gas, and a switching valve configured to control an inflow of the EGR gas to the cooling unit.

The switching valve blocks the inflow of the EGR gas to the cooling unit, when the temperature of the EGR gas from the exhaust manifold is not more than a predetermined temperature, and allows the inflow of the EGR gas to the cooling unit, when the temperature of the EGR gas from the exhaust manifold is higher than the predetermined temperature.

The above described aspect of the present invention may be such that the attachment part includes a first opening configured to supply the EGR gas from the exhaust manifold to the EGR cooler, and a second opening configured to supply the EGR gas from the EGR cooler to the EGR pipe.

The above described aspect of the present invention may be such that an upper end of the EGR cooler has a supply port into which the EGR gas is supplied and a discharge port from which the EGR gas is discharged, and the EGR cooler has therein a U-shaped path that connects to the supply port and the discharge port.

In the present invention, the EGR cooler is supported at only one position with respect to the exhaust manifold. Therefore, a stress applied to the flange of the EGR cooler due to thermal expansion can be suppressed and reduced. Further, the number of members can be reduced, because there is no need for using separately provided bands to support the EGR cooler.

BRIEF DESCRIPTION OF DRAWINGS

FIG. 4A A diagram providing a top view of the exhaust manifold.
FIG. 4B A diagram providing a front view of the exhaust manifold.
FIG. 4C A diagram providing a bottom view of the exhaust manifold.

EMBODIMENT OF EMBODIMENT

In the following, an embodiment of the present invention will be described with reference to the drawings.

Figure 1:
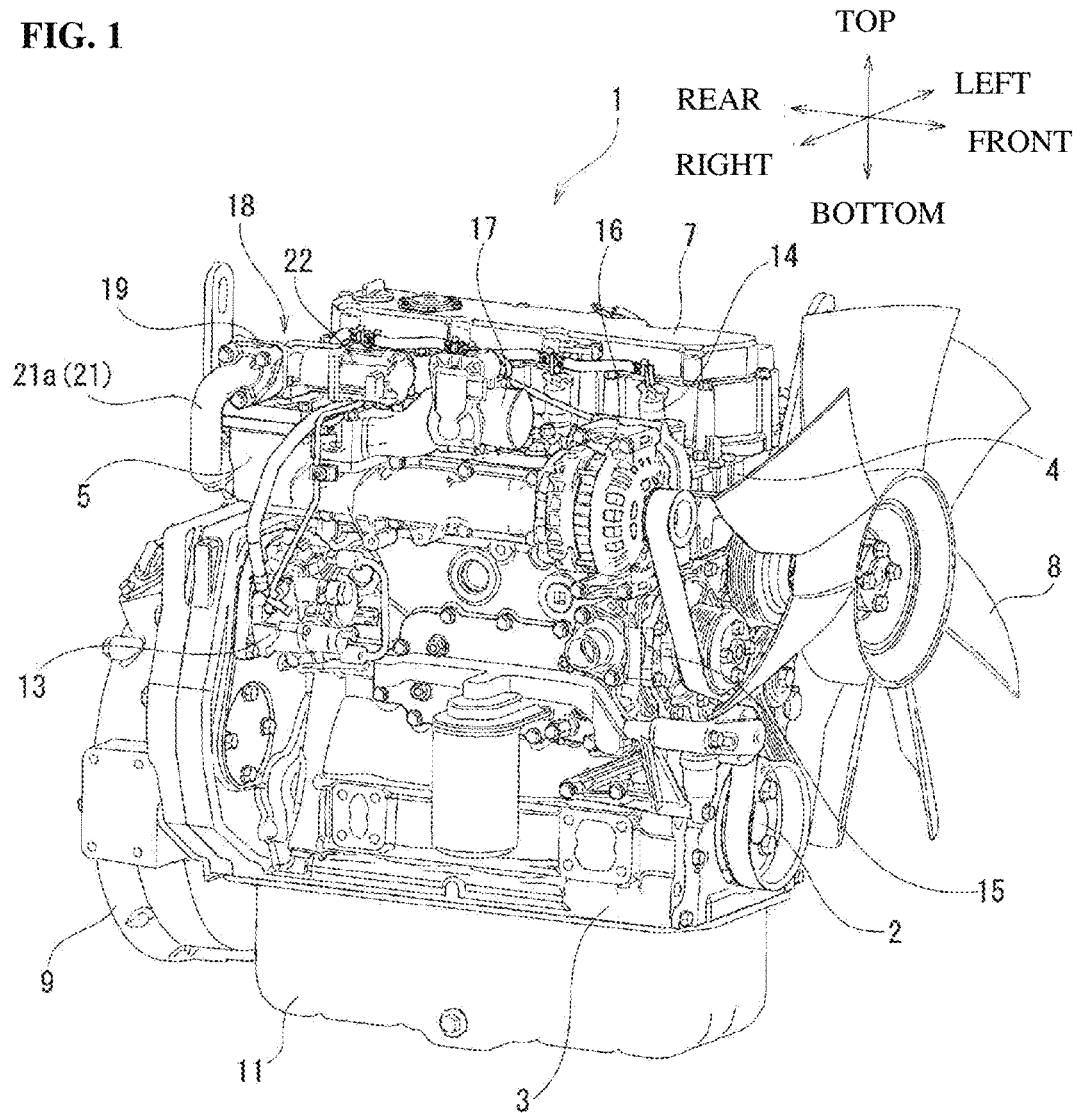
FIG. 1 A perspective view of an engine according to an embodiment.

First, a schematic structure of the engine 1 is described with reference to FIG. 1 and FIG. 2. It should be noted that, in the following description, two sides parallel to a crankshaft 2 are referred to as the left and right. A side where a cooling fan 8 is arranged is referred to as the front side. A side where a flywheel housing 9 is arranged is referred to as the rear side. A side where an exhaust manifold 6 is arranged is referred to as the left side. A side where an intake manifold 5 is arranged is referred to as the right side. A side where a cylinder head cover 7 is arranged is referred to as the upper side. A side where an oil pan 11 is arranged is referred to as the lower side. These expressions are used as the references of four directions and the positional relation of the engine 1.

An engine 1 as a motor mounted to a work machine such as an agricultural machine and a construction machine includes a crankshaft 2 serving as an output shaft of the engine and a cylinder block 3 having therein a piston (not shown). On the cylinder block 3, a cylinder head 4 is mounted. On the right side surface of the cylinder head 4, an intake manifold 5 is arranged. On the left side surface of the cylinder head 4, an exhaust manifold 6 is arranged. The top surface side of the cylinder head 4 is covered by a head cover 7. The crankshaft 2 has its front and rear ends protruding from front and rear surfaces of the cylinder block 3. On the front surface side of the engine 1, a cooling fan 8 is arranged. From the front end side of the crankshaft 2, rotational power is transmitted to the cooling fan 8 through a cooling fan V-belt.

On the rear surface side of the engine 1, a flywheel housing 9 is arranged. The flywheel housing 9 accommodates therein a flywheel 10 pivotally supported at the rear end side of the crankshaft 2. The rotational power of the engine 1 is transmitted from the crankshaft 2 to operating units of the work machine through the flywheel 10. An oil pan 11 for storing an engine oil is arranged on a lower surface of the cylinder block 3. The engine oil in the oil pan 11 is supplied to lubrication parts of the engine 1 through an oil pump (not shown) in the cylinder block 3, and then returns to the oil pan 11.

A fuel supply pump 13 is arranged below the intake manifold 5 on the right side surface of the cylinder block 3. Further, the engine 1 includes injectors 14 for four cylinders. Each of the injectors 14 has a fuel injection valve of electromagnetic-controlled type. By controlling the opening/closing of the fuel injection valves of the injectors 14, the high-pressure fuel in a common rail is injected from the injectors 14 to the respective cylinders of the engine 1.

On the front surface side of the cylinder block 3, a cooling water pump 15 for supplying cooling water is arranged. The rotational power of the crankshaft 2 drives the cooling water pump 15 along with the cooling fan 8, through the cooling fan V-belt. With the driving of the cooling water pump 15, the cooling water in a radiator (not shown) mounted to the work machine is supplied to the cylinder block 3 and the cylinder head 4 and cools the engine 1. Then the cooling water having contributed to the cooling of the engine 1 returns to the radiator. Above the cooling water pump 15, an alternator 16 is arranged.

The intake manifold 5 is connected to an intake throttle member 17. The fresh air (outside air) suctioned by the air cleaner is subjected to dust removal and purification in the air cleaner, and fed to the intake manifold 5 through the intake throttle member 17, and then supplied to the respective cylinders of the engine 1.

In an upper portion of the intake manifold 5, an EGR device 18 is arranged. The EGR device 18 is a device that supplies part of the exhaust gas of the engine 1 (EGR gas from the exhaust manifold 6) to the intake manifold 5, and includes an EGR pipe 21 connecting to the exhaust manifold 6 through an EGR cooler 20 and an EGR valve case 19 that communicates the intake manifold 5 to the EGR pipe 21.

A downwardly-open end portion of the EGR valve case 19 is bolt-fastened to an inlet of the intake manifold 5 protruding upward from the intake manifold 5. Further, a rightwardly-open end portion of the EGR valve case 19 is coupled to an outlet side of the EGR pipe 21. By adjusting the opening degree of the EGR valve member (not shown) in the EGR valve case 19, the amount of EGR gas supplied from the EGR pipe 21 to the intake manifold 5 is adjusted. The EGR valve member is driven by an actuator 22 attached to the EGR valve case 19.

In the intake manifold 5, the fresh air supplied from the air cleaner to the intake manifold 5 through the intake throttle member 17 is mixed with the EGR gas (part of exhaust gas from the exhaust manifold 6) supplied from the exhaust manifold 6 to the intake manifold 5 through the EGR valve case 19. As described, by recirculating part of the exhaust gas from the exhaust manifold 6 to the engine 1 through the intake manifold 5, the combustion temperature is lowered and the emission of nitrogen oxide (NOX) from the engine 1 is reduced.

The EGR pipe 21 is connected to the EGR cooler 20 and the EGR valve case 19. The EGR pipe 21 includes a first EGR pipe 21a arranged on the right side of the cylinder head 4, a second EGR pipe 21b formed in a rear end portion of the cylinder head 4, and a third EGR pipe 21c arranged on the left side of the cylinder head 4.

The first EGR pipe 21a is generally an L-shaped pipe. The first EGR pipe 21a has its inlet side coupled to an outlet side of the second EGR pipe 21b, and has its outlet side coupled to the EGR valve case 19.

Figure 2:
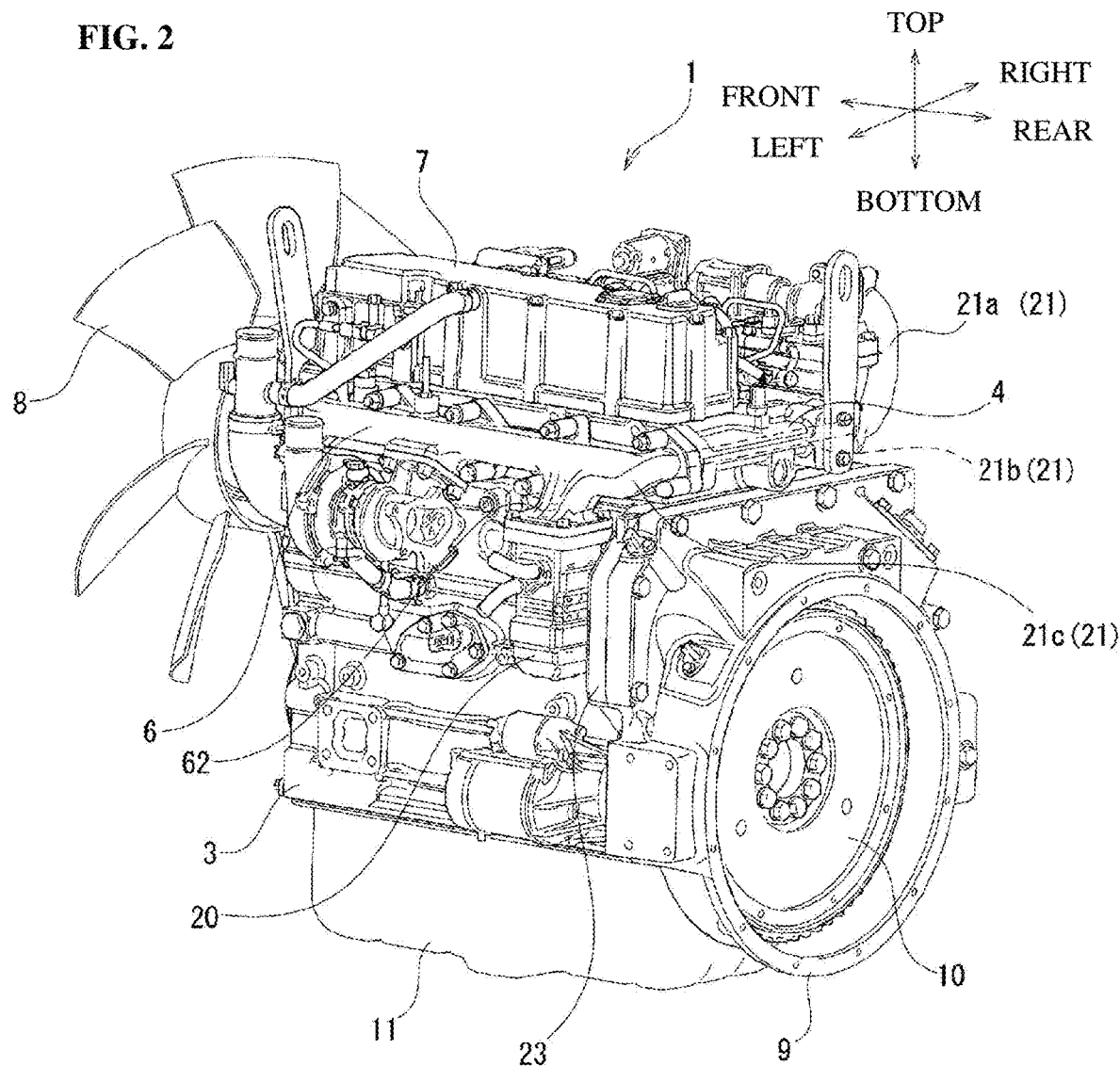
FIG. 2 A perspective view of the engine according to the embodiment.

The second EGR pipe 21b is formed in such a manner as to penetrate through the rear end portion of the cylinder head 4 in the left-and-right directions as shown in FIG. 2. In other words, the second EGR pipe 21b and the cylinder head 4 are integrally formed. The second EGR pipe 21b has its inlet side coupled to an outlet side of the third EGR pipe 21c, and has its outlet side connected to the inlet side of the first EGR pipe 21a.

The third EGR pipe 21c is formed inside the exhaust manifold 6. In other words, the third EGR pipe 21c and the exhaust manifold 6 are integrally formed. With the third EGR pipe 21c and second EGR pipe 21b integrally formed with the exhaust manifold 6 and the cylinder head 4, respectively, the space needed can be saved, and the pipes less likely receive an external impact.

Figure 3:
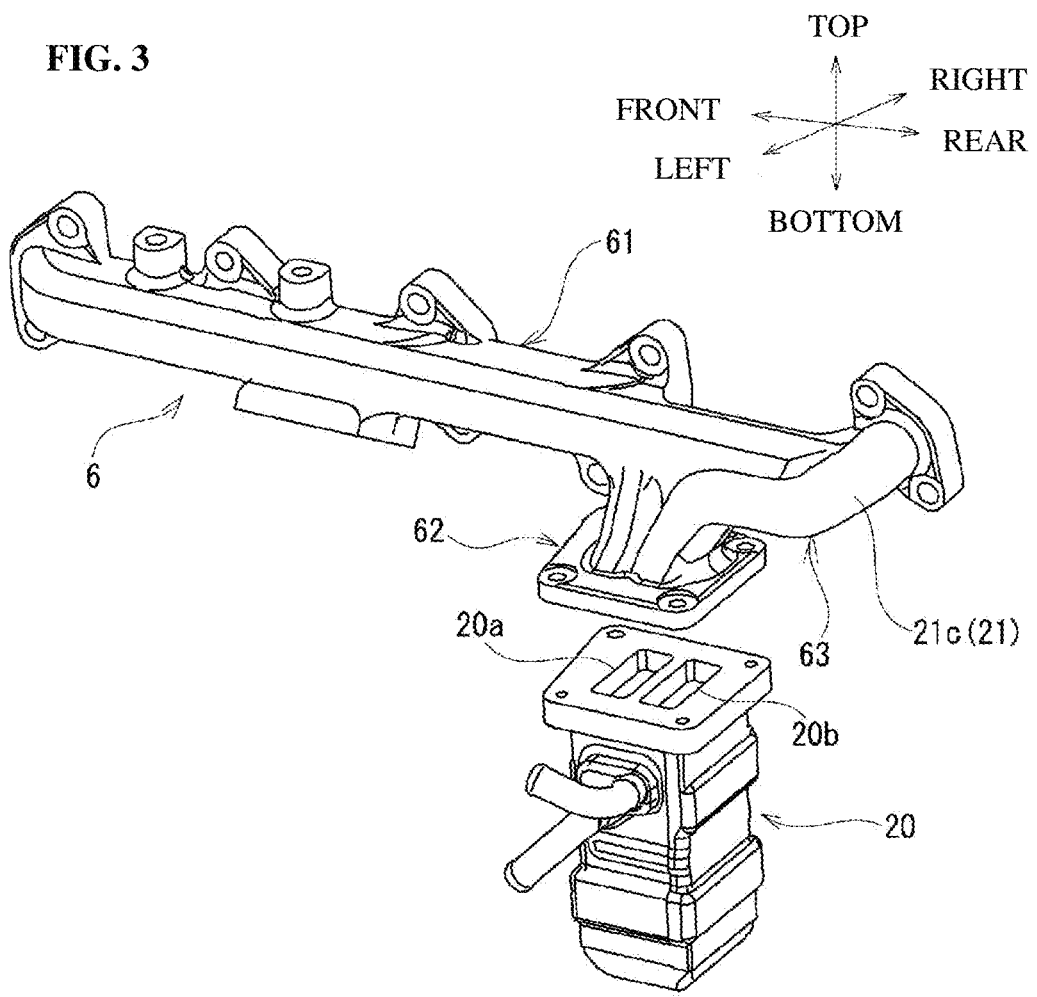
FIG. 3 An exploded perspective view of an exhaust manifold and an EGR cooler.

FIG. 3 is an exploded perspective view of the exhaust manifold 6 and an EGR cooler 20. FIG. 4A, FIG. 4B and FIG. 4C are a diagram providing a top view, a front view, and a bottom view of the exhaust manifold 6, respectively. The exhaust manifold 6 includes an aggregate part 61 configured to aggregate the exhaust gas from exhaust ports of the cylinders to one place and discharge the exhaust gas, an attachment part 62 protruding downward from the rear end of the aggregate part 61, and an EGR pipe unit 63 extended rearward from the attachment part 62. The third EGR pipe 21c is formed in the EGR pipe unit 63.

The attachment part 62 of the exhaust manifold 6 includes a first opening 62a configured to supply EGR gas from the exhaust manifold 6 to the EGR cooler 20, and a second opening 62b configured to supply EGR gas from the EGR cooler 20 to the third EGR pipe 21c. The first opening 62a and the second opening 62b are aligned in the front-and-rear direction. The attachment part 62 has therein an EGR gas draw-out passage 62c communicating the aggregate part 61 with the first opening 62a.

The EGR cooler 20 has a substantially quadrangular prism shape extended in the up-and-down direction. The EGR cooler 20 is attached to the downwardly protruding attachment part 62 provided to the exhaust manifold 6. An upper end of the EGR cooler 20 is bolt-fastened to the attachment part 62. In the present embodiment, the exhaust manifold 6 is cantilevered in such a manner as to be parallel (standing posture) to the axis direction of the cylinders (not shown).

The upper end of the EGR cooler 20 has a supply port 20a to which the EGR gas is supplied from the exhaust manifold 6, and a discharge port 20b from which the EGR gas is discharged to the third EGR pipe 21c. The supply port 20a and the discharge port 20b are aligned in the front-and-rear direction. The supply port 20a is coupled to the first opening 62a of the exhaust manifold 6. The discharge port 20b is coupled to the second opening 62b of the exhaust manifold 6. Further, inside the EGR cooler 20, a U-shape path connecting to the supply port 20a and the discharge port 20b is formed. The EGR gas, after traveling downward from the supply port 20a makes a U-turn to travel upward, towards the discharge port 20b. Thus, the EGR gas supplied from the supply port 20a to the EGR cooler 20 is discharged from the discharge port 20b through the U-shaped path.

Further, the EGR cooler 20 overlaps with a gear case cover 23 in a rear view, as shown in FIG. 2. The gear case cover 23 is arranged to face the flywheel housing 9, and covers a cam gear (not shown) together with the flywheel housing 9. Covering the cam gear with the gear case cover 23 and the flywheel housing 9 blocks the sound. Therefore, gear noise can be reduced. Since the EGR cooler 20 overlaps with the gear case cover 23, the EGR cooler 20 is protected from an external impact (particularly, from an impact from the rear side).

Figure 5A:
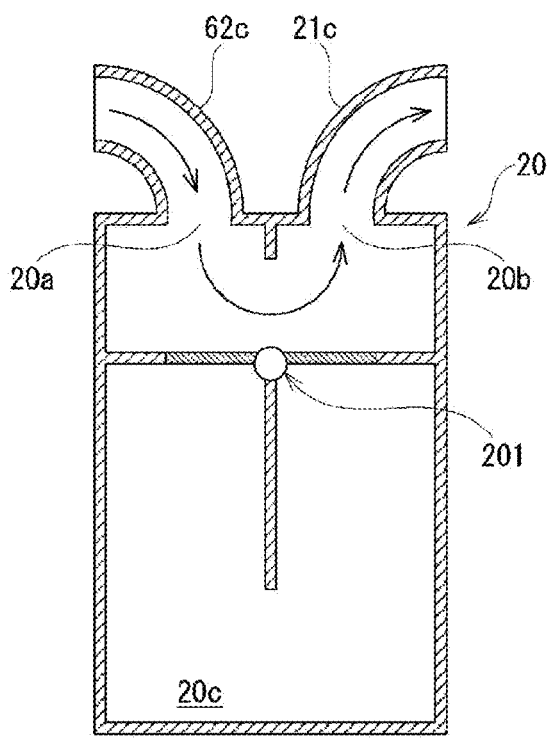
FIG. 5A and FIG. 5B A cross-sectional view schematically showing an EGR cooler.
Figure 5B:
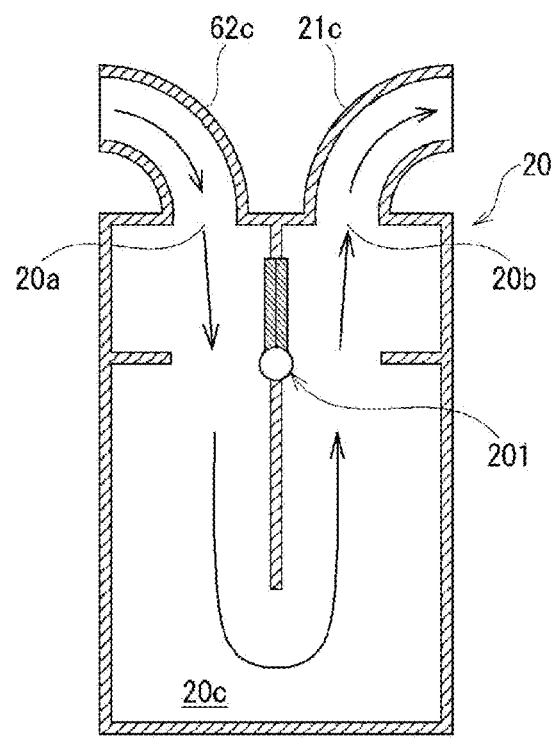

FIG. 5A and FIG. 5B schematically provide a cross-sectional view of the EGR cooler 20, and FIG. 5A shows a state where a switching valve 201 is closed, whereas FIG. 5B shows a state where the switching valve 201 is open. The arrow in the diagram shows the flow of the EGR gas.

The EGR cooler 20 includes a cooling unit 20c configured to cool the EGR gas and the switching valve 201 configured to control an inflow of the EGR gas to the cooling unit 20c. The cooling unit 20c is arranged below the EGR cooler 20. By driving the cooling water pump 15, the cooling water is supplied around the cooling unit 20c, thereby cooling the EGR gas passing through the cooling unit 20c.

When the temperature of the EGR gas from the exhaust manifold 6 is not more than a predetermined temperature, the switching valve 201 closes the passage to the cooling unit 20c as shown in FIG. 5A, and blocks the inflow of the EGR gas to the cooling unit 20c. This way, the EGR gas is not supplied to the cooling unit 20c while the temperature of the EGR gas is low. Therefore, a quick warm up can be possible. On the other hand, when the temperature of the EGR gas from the exhaust manifold 6 is higher than the predetermined temperature, the switching valve 201 opens the passage to the cooling unit 20c as shown in FIG. 5B, and allows the inflow of the EGR gas to the cooling unit 20c. This way, the EGR gas is supplied to the cooling unit 20c, while the temperature of the EGR gas is high. Therefore, the temperature of the EGR gas can be appropriately controlled.

An embodiment of the present invention has been described with reference to the drawings. It, however, should be considered that specific configurations of the present invention are not limited to this embodiment. The scope of this invention is indicated by the range of patent claims as well as the description of the enforcement form described above, as well as the range of patent claims and even meaning and all changes within the range.

REFERENCE SIGNS LIST

1 engine
3 cylinder block
4 cylinder head
5 intake manifold
6 exhaust manifold
18 EGR device
20 EGR cooler
20c cooling unit
21 EGR pipe
62 attachment part
201 switching valve

The invention claimed is:

1. An engine, comprising:
   an exhaust manifold, and
   an EGR cooler connected to the exhaust manifold,
   wherein the EGR cooler overlaps, in a rear view, with a gear case cover which is arranged to face a flywheel housing.

2. The engine according to claim 1, wherein a supply port is provided at an end of the EGR cooler and connected to the exhaust manifold to provide EGR gas.

3. The engine according to claim 2, wherein the supply port is provided at an upper end of the EGR cooler where the exhaust manifold is provided.

4. The engine according to claim 1, wherein
   the exhaust manifold has an attachment part which is connected to the EGR cooler, and
   the attachment part has a supply port into which the EGR gas is supplied from the exhaust manifold.

5. The engine according to claim 2, wherein the EGR cooler is provided between the gear case cover and a super charger which is located on an exhaust side of the engine.

* * * * *